INVENTORS.
JOHN R. THOMAS
THOMAS E. HICKS
BARNEY RUBIN
HOWARD W. CRANDALL
ATTORNEY.

INVENTORS.
JOHN R. THOMAS
THOMAS E. HICKS
BARNEY RUBIN
HOWARD W. CRANDALL

ATTORNEY.

United States Patent Office 2,916,349
Patented Dec. 8, 1959

2,916,349

CONTINUOUS CHELATION-EXTRACTION PROCESS FOR THE SEPARATION AND PURIFICATION OF METALS

Howard W. Crandall, Berkeley, Thomas E. Hicks, Los Angeles, Barney Rubin, Livermore, and John R. Thomas, Albany, Calif., assignors to the United States of America as represented by the United States Atomic Energy Commission Application March 12, 1954, Serial No. 415,985

11 Claims. (Cl. 23—14.5)

The present invention relates in general to the recovery of metal values and, particularly, to the recovery and purification of certain metal values from a complex mixture of materials.

Acidic solutions containing complex mixtures of materials which may be treated in the processes of the invention are available from a great many sources. Such solutions may be obtained, for example, in ore refining operations, processing of neutron-irradiated uranium and thorium, recovery of uranium and/or zirconium from alloy scrap, or such solutions may be the residual solutions obtained from processes wherein plutonium has been recovered from neutron-irradiated uranium. In the latter case, uranium can be obtained from such waste solutions free of plutonium and radioactive fission products, whereby a uranium product depleted in $U^{235}$, i.e., enriched in uranium isotope, 238, is made available to industry. Irradiated uranium from nuclear power reactors may also be subjected to purification and decontamination by the present process.

It has now been discovered that various metal values may be recovered from such solutions by a continuous cyclic chelation-extraction process employing fluorinated β-diketones, particularly, thenoyltrifluoroacetone contained in certain solvents. Moreover, there is provided a novel uranium salt solution recycling solvent extraction technique which allows the improved recovery of uranium without the necessity of using extraneous salting agents. Portions of the subject matter disclosed herein are further developments or are related to that presented in the copending applications of Melvin Calvin, filed November 13, 1947, Serial No. 785,806 for "Separation Process for Transuranic Elements and Compounds Thereof," now Patent No. 2,856,418, granted October 14, 1958, and of Howard W. Crandall and John R. Thomas, filed August 25, 1949, Serial No. 112,404, for "Separation Process for Zirconium and Compounds Thereof," now Patent No. 2,892,681, granted June 30, 1959. Such applications disclose, respectively, inter alia, conditions relevant to batch solvent extraction processes for the separation of plutonium and zirconium, individually, from impurities in contrast to the conditions relevant to an integrated continuous cyclic process disclosed in the present application whereby at least the aforesaid two materials and uranium can be separated from a complex impure mixture thereof.

Accordingly, it is an object of the invention to provide an efficient and economical continuous chelation-extraction process for recovering and purifying metal values.

Another object of the invention is to provide a continuous solvent extraction process employing fluorinated β-diketones for recovering and purifying metal values.

Still another object of the invention is to provide a method for the continuous solvent extraction of uranium wherein either a uranium solution is recycled directly or such a solution is recycled following evaporative concentration to effect efficient extraction and purification in the absence of an extraneous salting agent.

A further object of the invention is to provide a method for recovering metal values from a complex solution mixture of materials.

Other objects and advantages will become apparent by consideration of the following description taken in conjunction with the accompanying drawing, of which:

Figure 1:
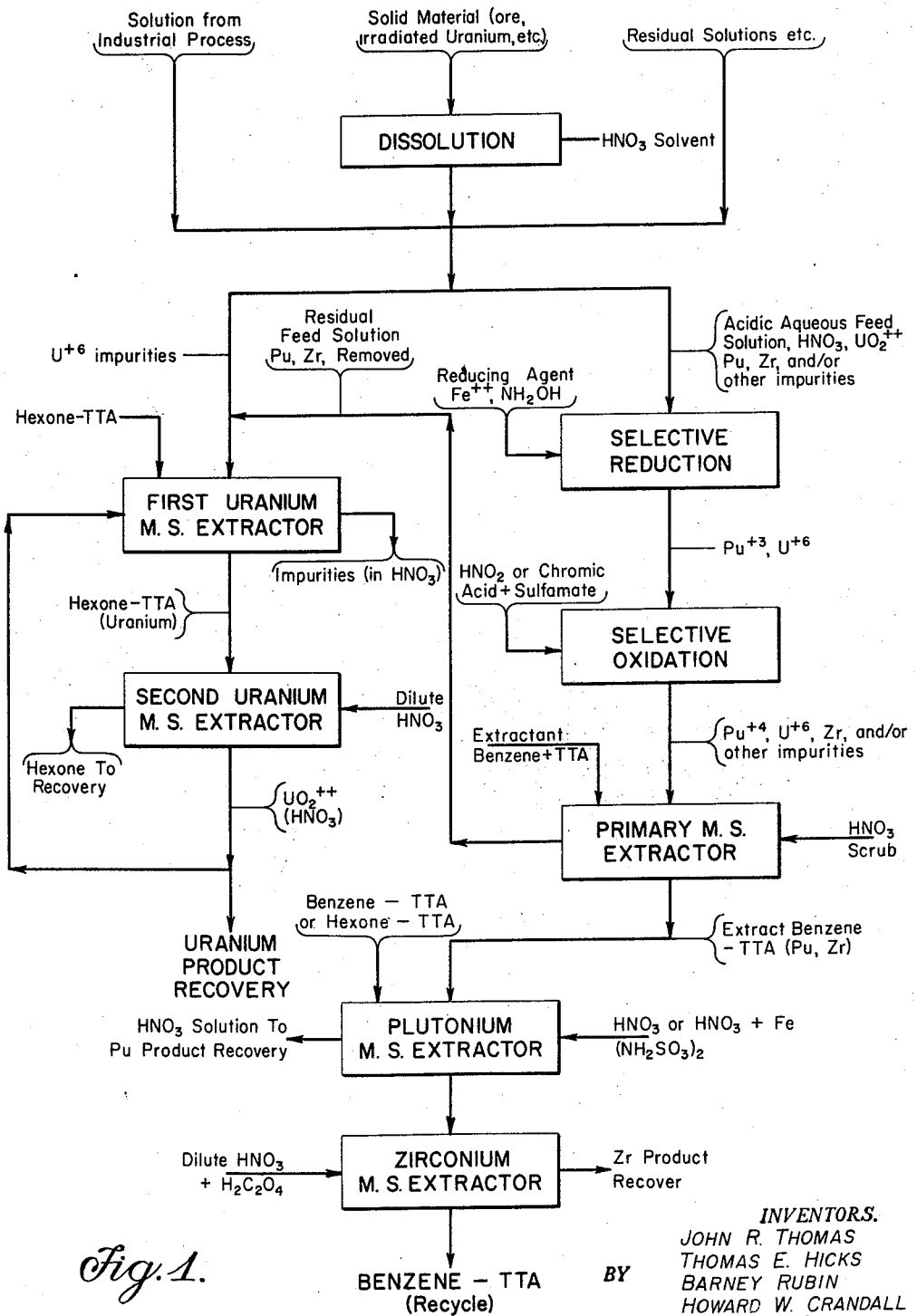
Figure 1 is a flow diagram illustrating the process of the invention.

At the outset it may be noted that operation of the present process will include the production of an acidic aqueous solution of the materials to be separated. Preferably, such solution will be an aqueous nitrate solution which may be obtained incident to operation of an industrial process, as a result of leaching or dissolving ores, residues from other processes or material such as neutron-irradiated uranium or contaminated uranium obtained from any source.

Since uranium which has been irradiated with neutrons contains a very large number of contaminants, it will be convenient, for illustrative purposes, to describe the present process with reference to such a material. While such a material often contains plutonium which is recoverable in a modification of the process, such a neutron-irradiated material may also be a residue obtained subsequent to the removal of plutonium and, accordingly, containing substantially only uranium depleted with respect to $U^{235}$, together with fission products. Materials containing only uranium and contaminants similar to such fission products are available from a large variety of other sources. Of course, it will be appreciated that radioactive fission isotope products will behave chemically just as do the natural element contaminants in the various operations.

In any event there is first obtained a nitric acid solution containing uranium. Other materials from which the uranium can be separated, if present, include plutonium, zirconium and/or the complex mixture of materials corresponding to the normal fission products derived from uranium. Due to the similarity in chemical characteristics of such impurity materials with other elements in the periodic system, it should be expected that the separation will operate with materials other than fission products also.

In the event that such solution contains plutonium the solution is first treated to place the plutonium in the tetrapositive oxidation state. To insure that all of the plutonium is in the tetrapositive state the Pu is generally reduced to the $Pu^{+3}$ state and then oxidized to the $Pu^{+4}$ state in such a manner that the uranium remains in the $U^{+6}$ state. Hydroxylamine or ferrous ion is suitable for reducing the plutonium to the tripositive state while nitrous acid or dichromate can be used to oxidize the $Pu^{+3}$ to the $Pu^{+4}$ state. $Pu^{+4}$ disproportionates into $Pu^{+3}$ and $Pu^{+5}$ at a rate dependent on Pu concentration, acidity and nitrate ion concentration of the solution. A combination of chromic acid and ferrous sulfamate can also be used to selectively oxidize and retain the plutonium in the $Pu^{+4}$ state. High nitrate and acid concentrations and low plutonium concentration tend to stabilize the $Pu^{+4}$ state.

In accordance with the present invention either the original acidic aqueous solution or the solution resulting from the reduction-oxidation step is subjected to continuous extraction with an organic phase comprising a fluorinated β-diketone dissolved in a selected solvent. This operation may be performed in conventional mixer-settler units, countercurrent-extraction columns or similar device. Thenoyltrifluoroacetone has given excellent results as the chelation-extraction agent and is, therefore, preferred. In systems used for extracting uranium, hexone has been found to yield superior results as the selected solvent while benzene yields superior results in extracting plutonium, where such is required. Chlorobenzenes and alkyl benzene, particularly monoalykyl derivatives of benzene, yield results similar to that of benzene and those whoch possess higher flash points are desirable in order to eliminate explosive hazards. Toluene, ethyl benzene, m-xylene, aryl benzene ($C_5$–$C_6$ side chain), and n-propyl, isopropyl, sec-butyl, t-butyl, and sec-amyl benzene are examples of satisfactory substituted benzenes.

Different modes of operation are employed depending on the materials present in the aqueous solution. In general, the materials present in such solution can be classified into at least three groups with respect to extraction from the aqueous phase. Plutonium in the plus 4 oxidation state and zirconium are extracted together away from the uranium and impurities under specified conditions and are later separated by extraction under other conditions. The uranium may then be recovered from the solution after the plutonium and/or zirconium are removed leaving substantially all other materials therein by either of two alternative processes described more fully hereinafter. Further treatment can then be instituted to separate other materials therefrom. In the absence of plutonium or zirconium the procedure can be considerably simplified to purify and recover uranium alone as described hereinafter.

More specifically with reference to the flowsheet of Fig. 1, when zirconium and/or plutonium is present in the feed solution, the solution, subsequent to selective fixing of the plutonium, if present, in the plus four oxidation state and being about 0.25 to 0.572 M in $HNO_3$, is center fed to a primary multistage extractor to be passed through one half of the extractor to emerge from one end thereof. Extractant, e.g., a benzene solution of a fluorinated β-diketone such as thenoyltrifluoroacetone is end fed into the primary extractor so as to flow countercurrent to the feed solution, is efficiently contacted therewith and is discharged at the opposite end of the extractor bearing the zirconium and plutonium therewith. To increase the purity of this extract and insure that little uranium appears therein, a dilute nitric acid scrub solution is fed into said extract discharge end of the column, countercurrent to the benzene-TTA chelate extract and so as to be discharged in admixture with the effluent feed solution. Accordingly, it will be understood this operation is productive of a benzene solution of fluorinated β-diketone chelates of plutonium and zirconium and an aqueous $HNO_3$ solution containing the uranium and a variety of impurities which solutions are treated further as hereinafter provided.

The aforesaid benzene solution containing plutonium and zirconium is centerfed to a plutonium multistage extractor wherein it is efficiently and countercurrently contacted with a dilute nitric acid solution (about 1–2 M) or an even more dilute nitric acid, i.e., of about 0.25 to 1.75 M, solution of ferrous ammonium sulfamate whereinto the plutonium is extracted and the extract is discharged from the first end of the extractor while the benzene solution of zirconium chelate is discharged from the other end. When using a nitric acid solution, Pu is extracted in the tetrapositive state while with the sulfamate solution the Pu is reduced to the tripositive state and extracted. To improve the purity of the plutonium solution a benzene solution of the fluorinated β-diketone is fed into the extractor between the second end and the midpoint to counter-currently contact the plutonium solution and be merged and discharged in admixture with the zirconium chelate solution. The plutonium can then be recovered from the nitric acid solution by basic precipitation with or without oxidation or by other conventional methods.

The benzene solution of the zirconium chelate is end fed into a zirconium multistage extractor to be countercurrently contacted with a dilute nitric acid-oxalic acid solution whereinto the zirconium is extracted and the residual benzene which still contains substantial amounts of the fluorinated β-diketone is recycled after reconstitution. Such nitric and oxalic acid concentrations are about, e.g., 0.5 M and 0.05 M, respectively, as disclosed hereinafter. Zirconium of high purity can then be recovered from the dilute nitric-oxalic acid solution by basic precipitation or other conventional methods. It will be apparent that in the absence of either zirconium and/or plutonium in the original feed solution that either of the foregoing extractions or both, respectively, may be omitted and the process operated for the recovery of the uranium and other materials as described hereinafter.

In order to recover uranium from the residual feed solution obtained from the primary multistage extractor or the original feed solution if such is free of zirconium and plutonium, such solution is centerfed into a first multistage uranium extractor wherein it is first contacted with a hexone phase whereinto a large proportion of the uranium is extracted and is subsequently contacted with a hexone fluorinated β-diketone solution whereinto the remainder of the uranium is extracted while the aqueous solutions containing the impurities are discharged from one end of the extractor. The hexone and hexone-diketone solutions merge in the extractor and are discharged from the opposite end following countercurrent contact with a purified uranyl nitrate scrub solution introduced at said opposite end. As a result of contact with this scrub solution, impurities are reduced to a very low level. In cases where such purity is not required no treatment with scrub solution is necessary. Uranium contained in the said scrub solution is extracted into the hexone phase and, accordingly, appears in the purified hexone-diketone uranium solution while the aqueous residue is merged with the original solution. The scrub solution is preferably produced by evaporative concentration as described below in order that no salting agent is added from an external source. Therefore, the recovery of other materials included with the impurities in the merged aqueous solution is greatly facilitated. Also, it should be apparent, since use of an extraneous salting agent is avoided, the bulk of the discharged materials, i.e., solids content, is greatly decreased.

Uranium contained in the mixed hexone-hexone fluorinated β-diketone solutions is removed therefrom in a second multistage uranium extractor by efficient countercurrent contact with a dilute nitric acid solution thereby yielding a dilute nitric acid solution of purified uranyl nitrate. The mixed hexone-hexone-TTA solutions may be recycled as described below. A portion of this uranyl nitrate solution can be recycled as the scrub solution noted above. All of the purified uranium can eventually be recovered from the nitric acid solution by conventional means. It should be noted that uranyl chelate solutions in hexone wherein the chelate concentration is above about 0.5 gram-moles per liter is more dense than aqueous phases used herein while those with concentrations below about 0.25 gram-moles per liter are less dense than the aqueous phases thereby necessitating appropriate design of the extractors.

Figure 2:
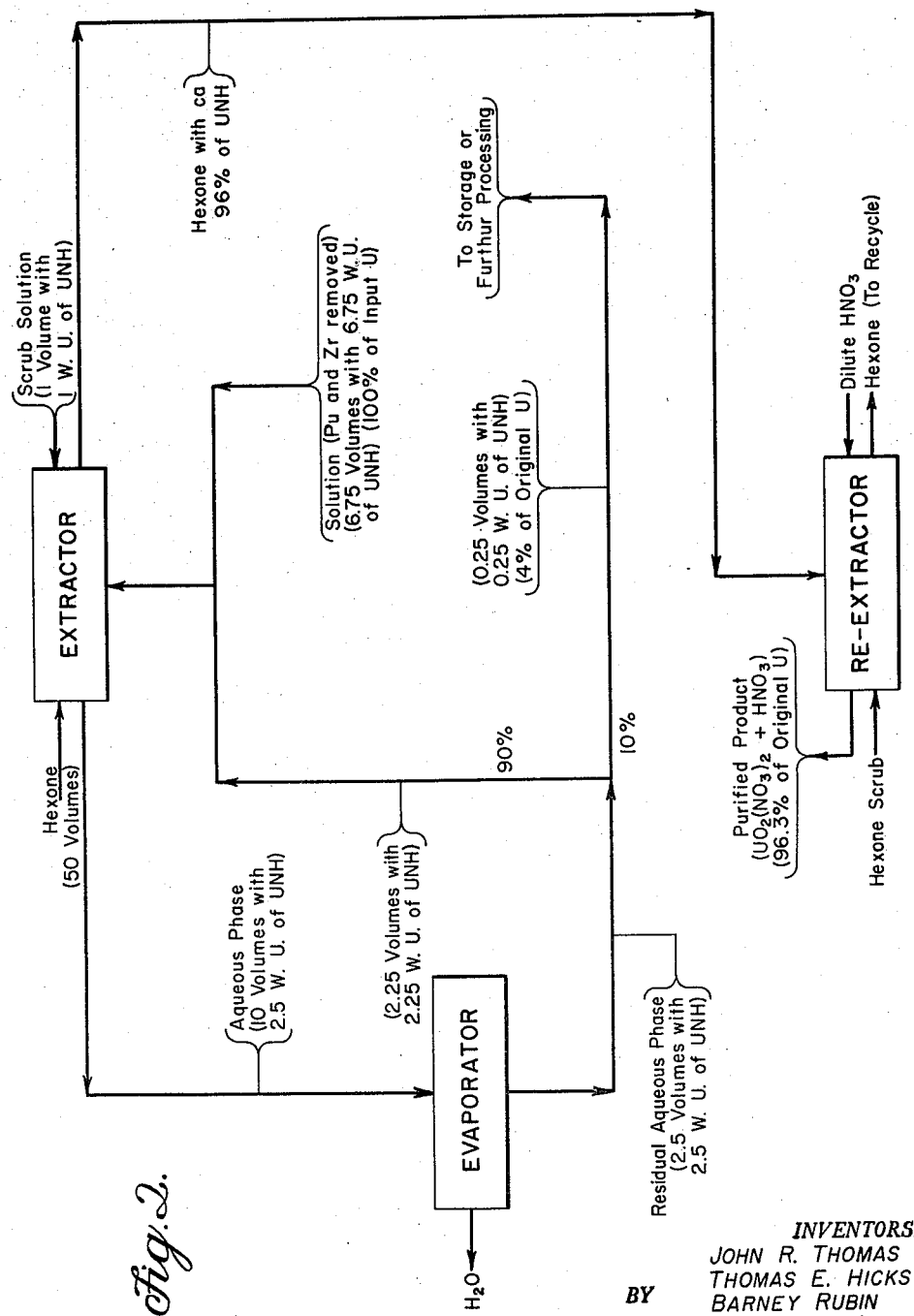
Figure 2 is a flow diagram of a modified process illustrating the use of the recycling technique in a hexone extraction of uranium.

Alternatively to the foregoing method of recovering the uranium, the uranium may be recovered from the residual feed solution by the process described in Example IV, and shown in Fig. 2 of the drawing.

Further details of the invention will become apparent by consideration of the following illustrative examples:

EXAMPLE I

Continuous plutonium extraction experiments were performed using two five-stage countercurrent liquid-liquid extractors each constructed of a five foot section of one inch inside diameter industrial Pyrex glass pipe. Five three inch deep stirring wells spaced at ten inch intervals along the pipe defined such stages with a rheostated motor driven seven-eighths inch vertically oriented disc paddle disposed in each of said wells to provide adequate agitation of the phases and thus assure efficient contact therebetween. Two weirs or baffles spaced about four inches apart and disposed within the pipe lengths between the wells provided positive interface control and formed settling sections wherein phase separation was accomplished. Feed solutions, gauged by Rotameters and regulated by needle valves, were fed into the appropriate portion of the extractor and removed at selected locations as required.

In operation, each extractor contained about 500 ml. of each phase, each phase being distributed with about 50% in the mixer wells, 30% in the four settling chambers formed by the two weirs between the wells, and with 20% in the two terminal settling chambers. Therefore, at a flow rate of 10 ml./min. for each phase, replacement time, i.e., residence time for each phase in each stage was about 5 minutes.

A solution formed by dissolving neutron irradiated uranium metal in nitric acid was processed in said extractors disposed in an arrangement corresponding to the diagrammatic representation of the primary multistage and plutonium multistage extractors in Fig. 1 of the drawing. Such solution contained about 2.3 M of uranyl nitrate, plutonium, zirconium, other fission products and excess nitric acid in an amount corresponding to dilute acid concentration. A preliminary treatment, as noted hereinbefore, i.e., selective reduction and oxidation with chromic acid, was employed to establish the plutonium in the IV oxidation state and then the solution was center fed into the primary extractor and discharged at one end thereof. A benzene solution of thenoyltrifluoroacetone (TTA) was fed into the aforesaid discharge end of the same extractor so as to contact the said solution, extract the plutonium and zirconium as chelates and be discharged from the other end of the extractor. Dilute nitric acid was fed into the extractor at the extractant discharge end of the extractor so as to countercurrently contact the extractant phase, remove impurities therefrom and finally merge with and be discharged with the original uranium solution which was now devoid of plutonium and zirconium.

The benzene solution of plutonium and zirconium chelates was center fed into the second extractor (plutonium multistage extractor) and discharged from one end thereof. At the said discharge end, either a dilute nitric acid solution or an even more dilute nitric acid solution containing ferrous sulfamate was fed into the extractor to countercurrently contact the benzene-TTA chelate solution, extract the plutonium therefrom and be discharged from the other end of the extractor. A benzene-TTA solution was fed into the plutonium discharge end of the extractor to countercurrently contact the aqueous plutonium phase to extract any residual zirconium therefrom and to merge with and be discharged with the original benzene-TTA solution which now was devoid of plutonium and contained only the zirconium.

Other details and the results of the experiments are illustrated in the table, which follows. Experiments 2, 3, 4, and 6 illustrate reextraction of the plutonium by means of reduction (ferrous sulfamate and dilute nitric acid) while experiments 1 and 5 illustrate reextraction of plutonium with dilute nitric acid alone.

EXAMPLE II

An experiment illustrating the behavior of zirconium in a process similar to that of Example I was conducted as follows:

A feed solution containing 1 M $HNO_3$, 0.7 M $Al(NO_3)_3$ and radioactive zirconium tracer was fed into an extractor similar to those of Example I (five stages) at a flow rate of 6 cc./min. and countercurrently contacted therein with an 0.05 M TTA in hexone solution, flowing at a rate of 10 cc./min., whereby 99.5% of the zirconium was extracted. The extract was centerfed into a second column and countercurrently extracted in three stages with an 0.5 M $HNO_3$ and 0.05 M $H_2C_2O_4$ aqueous solution flowing at a rate of 3.3 cc./min. 2 cc./min. of hexone flowing countercurrently in the second extractor

*Table*
CONTINUOUS COUNTERCURRENT EXTRACTION AND REEXTRACTION OF PLUTONIUM [1] USING TTA IN BENZENE

| Run No. | Description | Benzene Extractant Phase I | Aqueous Feed I | Aqueous Scrub I | Benzene Scrub II | Aqueous Reextractant II | Recovery, percent I | Recovery, percent II | Total Time of Run |
|---|---|---|---|---|---|---|---|---|---|
| 1 | Aqueous feed I center-fed. Benzene phase from I center-fed into II. | 0.0162 M TTA, 6 cc./min. | 0.25 M $HNO_3$, 5×10⁻⁵ M $K_2Cr_2O_7$, 12.5 cc./min. | 0.5 M $HNO_3$, 2.5 cc./min. | 0.03 M TTA, 1.9 cc./min. | 2.25 M $HNO_3$, 5.6 cc./min. | 91 | 100 | 7 hrs., 40 min. |
| 2 | Aqueous feed I end-fed. Benzene phase from I center-fed into II. | 0.0172 M TTA, 9.8 cc./min. | 0.572 M $HNO_3$, 2×10⁻⁵ M $K_2Cr_2O_7$, 6.7 cc./min. | None | 0.0172 M TTA, 2.0 cc./min. | 0.572 M $HNO_3$, 0.005 M, $NH_2OH\cdot HCl$, 0.005 M $Fe(ClO_4)_2$, 7.0 cc./min. | 95 | 50 | 8 hrs. |
| 3 | do | 0.0150 M TTA, 10 cc./min. | 0.5 M $HNO_3$, 2×10⁻⁵ M $K_2Cr_2O_7$, 10 cc./min. | do | 0.0150 M, 2.0 cc./min. | 0.644 M $HNO_3$, 0.005 M $NH_2SO_3H$, 0.005 M $Fe(ClO_4)_2$, 6.0 cc./min. | 80 | 90 | 5 hrs. |
| 4 | do | 0.02 M TTA, 10 cc./min. | 0.5 M $HNO_3$, 3×10⁻⁵ M $K_2Cr_2O_7$, 11.1 cc./min. | do | 0.02 M TTA, 0.94 cc./min. | 1.0 M $HNO_3$, 0.023 M $NH_2SO_3H$, 0.023 M $Fe(ClO_4)_2$, 13.3 cc./min. | 80 | 85 | 8 hrs. |
| 5 | Aqueous feed I end-fed. Benzene phase from I end-fed into II. | 0.026 M TTA, 10.1 cc./min. | 0.5 M $HNO_3$, 2×10⁻⁵ M $K_2Cr_2O_7$, 11.0 cc./min. | do | None | 2.0 M $HNO_3$, 11.4 cc./min. | 94 | 100 | 6 hrs. |
| 6 | Same as 2 | 0.062 M TTA, 9.0 cc./min. | 2.3 M $UO_2^{++}$,[2] 0.34 M $HNO_3$, 2×10⁻⁵ M $K_2Cr_2O_7$, 9.5 cc./min. | do | Benzene, 1.5 cc./min. | 1.75 M $HNO_3$, 0.01 M $NH_2SO_3H$, 0.01 M $Fe(ClO_4)_2$. | 95 | 92 | 7 hrs. |

[1] PU(IV) Concentration in all aqueous feeds was about 1 mg./liter.
[2] Synthetic solution.

was employed to scrub TTA and other materials from the aqueous extract. 99.9+% of the zirconium was extracted in the second column yielding an aqueous solution from which the zirconium could easily be removed. Either benzene (also the alkyl-benzenes) or hexone are also suitable solvents for zirconium extraction using TTA.

EXAMPLE III

Uranium was recovered from the aqueous solution remaining after the plutonium and zirconium were removed by a method utilizing uranium ion salting and chelation. The apparatus arrangement corresponded to that of the first and second multistage uranium reactors shown in Fig. 1 of the drawing.

In such procedure, the solution which had originally contained a concentration of about 2.3 M of $UO_2(NO_3)_2$ and 0.3 M $HNO_3$ was centerfed into a first uranium multistage extractor and contacted with hexone. Following such contact the hexone and aqueous nitric acid phases were separated and discharged from opposite ends of the extractor, whereby uranium entered the hexone phase and impurities remained in the aqueous nitric acid phase. A small volume of concentrated solution of TTA in hexone was introduced into the nitric acid discharge end of the extractor to countercurrently contact the nitric acid phase, removing residual uranium therefrom, finally merging with the hexone solution and being discharged therewith. Previously processed (purified) uranyl nitrate-nitric acid scrub solution was introduced into the hexone discharge end of the extractor to counter-currently contact the hexone phase thereby extracting residual impurities therefrom, and finally merging with and being discharged with the said aqueous nitric acid phase. During transit through the extractor, the uranium contained in the aqueous scrub phase was extracted into the hexone phase along with the uranium salt content of the aqueous solution producing a salting action which markedly improved the recovery of the uranium and lowered impurity content of the uranium extract solution.

The hexone phase containing the uranium partly as a chelate was end fed into a second uranium multistage extractor and countercurrently contacted with a dilute nitric acid solution wherein the uranium was extracted to yield a purified uranyl nitrate-nitric acid solution which is suitable for recycle as the scrub solution noted hereinbefore. As more purified solution is produced than is recycled, a net gain is achieved and eventual total recovery of uranium is feasible. Hexone phase discharged from this extractor may be recycled with or without purification as required.

EXAMPLE IV

The uranium ion salting principle noted hereinbefore is also advantageously employed in the alternative uranium recovery cycle wherein no TTA is used for uranium extraction as illustrated in Fig. 2 of the drawing. In such process there is employed a ten stage extractor into which is center fed 6.75 volumes of a uranyl nitrate-dilute nitric acid solution (UNH) which contains impurities other than plutonium or zirconium. Such a solution might be obtained as a result of removing plutonium and zirconium, as noted hereinbefore, or in any other manner. For illustrative purposes, solution quantities will be indicated generally as volumes while amounts of uranium (as uranyl) will be indicated in weight units (W.U.). For example, any arbitrary solution such as a 2.5 M $UO_2(NO_3)_2$ solution, may be indicated as containing 1 W.U. per volume; however, it will be understood that the values noted are consistent and correlative.

Introduced with said 6.75 volumes of an aqueous solution are 2.25 volumes of a solution containing 2.25 W.U. of UNH obtained as noted hereinafter yielding a total of 10 volumes of solution containing 10 W.U. of UNH introduced per unit time. Such solution is discharged from one end of the extractor. Hexone is introduced at said discharge end of the extractor to countercurrently contact the aqueous solution, extracting the uranium therefrom, and being discharged at the other end of the extractor. One volume of a scrub solution containing 1 W.U. of UNH is introduced at the hexone discharge end of the extractor to countercurrently contact the hexone extract, thereby removing impurities therefrom, and merging with the original aqueous solution and being discharged therewith. As a result of this last operation the UNH in the scrub solution enters the hexone phase while the impurities remain in the aqueous phase with some UNH, e.g., about 10 volumes with 2.5 W.U. of UNH.

The aqueous phase is concentrated in an evaporator in a ratio of 4:1 yielding 2.5 volumes of residual aqueous phase containing 2.5 W.U. of UNH. 90% of this solution, containing 2.25 W.U. of UNH is recycled with the original aqueous solution, as noted above, while the remaining 10% is discarded, stored, or subjected to further processing if greater uranium recovery is required. Desired materials from among the impurities may also be recovered from this fraction of residual aqueous phase.

The hexone phase (50 volumes) containing about 96% of the introduced UNH is centerfed into a re-extractor and is discharged from one end thereof following countercurrent contact with dilute nitric acid wherein the uranium is extracted. Such nitric acid extract (96% of the original U) is discharged from the opposite end of the re-extractor following countercurrent contact with a hexone scrub, as a purified aqueous nitric acid-uranyl nitrate product solution from which the uranium is recoverable by conventional means. The hexone scrub removes impurities from the aqueous phase, merges with the introduced hexone and is recycled therewith as the original 50 volumes of hexone.

While there have been described in the foregoing what may be considered to be preferred embodiments of the invention, modifications may be made therein and it is intended to cover all such which fall within the scope of the appended claims.

What is claimed is:

1. In an integrated cyclic process for separating and recovering materials including plutonium, zirconium and uranium from an impure solution in nitric acid of about 0.25 to 0.572 M concentration, the steps comprising treating said solution with oxidation-reduction agents to place the plutonium in the IV oxidation state while maintaining the uranium in the hexavalent state, continuously countercurrently contacting the solution with a solvent extractant phase comprising a solvent and a fluorinated β-diketone in a multistage extractor to extract the plutonium and zirconium thereinto while leaving the uranium in the residual acid solution, continuously countercurrently contacting the solvent extract obtained in the foregoing operation with a nitric acid solution having a concentration in the range of about 1 to 2 M in a multistage extractor to extract the plutonium thereinto, then contacting the solvent extract with a dilute nitric acid solution of oxalic acid in a multistage extractor to extract the zirconium therefrom, continuously countercurrently contacting the residual acid solution with hexone in a multistage extractor to extract the uranium therefrom, and recovering the uranium from the hexone extract.

2. The process as described in claim 1 wherein said fluorinated β-diketone comprises thenoyltrifluoroacetone.

3. In an integrated cyclic process for separating and recovering materials including plutonium, zirconium and uranium from an impure solution in nitric acid of about 0.25 to 0.572 M concentration, the steps comprising treating said solution with oxidation-reduction agents to place the plutonium in the IV oxidation state while maintaining the uranium in the hexavalent state; continuously centerfeeding the treated solution into a first multistage extractor to pass through one half and be discharged at one end thereof, introducing a solvent extractant phase including a fluorinated β-diketone extractant and a solvent selected from the group consisting of benzene, chlorobenzene and alkyl derivatives of benzene at the aforesaid discharge end to countercurrently contact said treated solution to be discharged at the opposite end thereof, thereby extracting zirconium thereinto leaving the uranium in the residual acid solution, simultaneously and continuously introducing nitric acid of about 0.5 M concentration to countercurrently contact the extract phase and be discharged with the residual acid solution, thereby to scrub impurities from the discharged extractant phase; centerfeeding the discharged extract through one half of a second multistage extractor, countercurrently contacting the extract in said half of the second extractor with an agent selected from the group consisting of dilute nitric acid and nitric acid with added sulfamate to extract the plutonium thereinto, simultaneously introducing and countercurrently contacting the aqueous plutonium extract phase in the second half of said second multistage extractor with a solution of fluorinated β-diketone in a solvent selected from the group consisting of hexone, benzene and alkyl benzenes, whereby residual impurities are removed from the aqueous plutonium extract and the benzene phase merges with said residual extract phase containing the zirconium; continuously contacting the merged extract phase with a dilute nitric acid solution of oxalic acid to extract the zirconuim therein in another extractor; neutralizing the zirconium extract to precipitate zirconium therefrom; centerfeeding and continuously countercurrently contacting the aqueous solution discharged from the first multistage extractor with hexone in one half of a first uranium multistage extractor to extract uranium therein, introducing a uranyl nitrate scrub solution at the hexone discharge end of said extractor to countercurrently contact the hexone phase in at least a portion of the second half of said extractor, whereby uranium is extracted by the hexone providing a uranium ion salting action and the residual portion of the scrub solution merges and is discharged with the residual effluent aqueous solution; and removing uranium from the discharged hexone phase by extraction with dilute nitric acid in a second multistage uranium extractor.

4. The process as defined in claim 3 but wherein said fluorinated β-diketone comprises thenoyltrifluoroacetone.

5. The process as defined in claim 3 wherein the dilute nitric acid solution of uranium discharged from the second multistage uranium extractor is concentrated by evaporation and a portion of the concentrated solution is recycled as said uranyl nitrate scrub solution.

6. In an integrated cyclic process for separating and recovering materials including plutonium, zirconium and uranium from an impure solution in nitric acid of about 0.25 to 0.572 M concentration, the steps comprising treating said solution with oxidation-reduction agents to place the plutonium in the IV oxidation state while maintaining the uranium in the hexavalent state; continuously centerfeeding the treated solution into a first multistage extractor to be discharged at one end thereof, introducing a solvent extractant phase including a fluorinated β-diketone extractant and a solvent selected from the group consisting of benzene, chlorobenzene and alkyl derivatives of benzene at the aforesaid discharge end to countercurrently contact said treated solution and be discharged at the opposite end thereof, thereby extracting zirconium thereinto leaving the uranium in the residual acid solution, simultaneously and continuously introducing nitric acid of about 0.5 M concentration at the extract phase discharge end of said extractor to flow in countercurrent contact therewith and be discharged with the residual acid solution containing the uranium, thereby to scrub impurities from the discharged extractant phase; centerfeeding the discharged extract through one half of a second multistage extractor, countercurrently contacting the extract in said half of the second extractor with an agent selected from the group consisting of dilute nitric acid and nitric acid with added sulfamate to extract the plutonium thereinto leaving zirconium in the residual extract which is discharged at the opposite end of the extractor, counter currently contacting the aqueous plutonium extract phase in the second half of said second multistage extractor with a solution of fluorinated β-diketone in a solvent selected from the group consisting of hexone, benzene and alkyl benzenes to extract residual impurities therein and be discharged with said residual extract phase containing the zirconium; continuously contacting the extract phase with a dilute nitric acid solution of oxalic acid to extract the zirconium therein in another extractor; neutralizing the zirconium extract to precipitate zirconium therefrom; recovering the plutonium from the aqueous plutonium extract after the zirconium is extracted therefrom; centerfeeding and continuously countercurrently contacting the aqueous solution discharged from the first multistage extractor with hexone in one half of a first uranium multistage extractor to extract uranium therein, countercurrently contacting the hexone phase in the second half of said extractor with a uranyl nitrate scrub solution wherefrom uranium is extracted into the hexone phase providing a uranium ion salting action and the residual scrub solution is discharged with the residual effluent aqueous solution; and removing uranium from the discharged hexone phase by extraction with dilute nitric acid in a second multistage uranium extractor.

7. In an integrated cyclic process for separating and recovering materials including plutonium, zirconium and uranium from an impure solution in nitric acid of about 0.25 to 0.572 M concentration, the steps comprising treating said solution with oxidation-reduction agents to place the plutonium in the IV oxidation state while maintaining the uranium in the hexavalent state; continuously centerfeeding the treated solution into a first multistage extractor to be discharged at one end thereof, introducing a solvent extractant phase including a fluorinated β-diketone extractant and a solvent selected from the group consisting of benzene, chlorobenzene and alkyl derivatives of benzene at the aforesaid discharge end to countercurrently contact said treated solution and be discharged at the opposite end thereof, thereby extracting zirconium thereinto leaving the uranium in the residual acid solution, countercurrently extracting impurities from the organic extract phase with nitric acid of about 0.5 M concentration and discharging the impurity extract at the opposite end of the extractor; centerfeeding the organic extract through one half of a second multistage extractor, countercurrently contacting the extract with an agent selected from the group consisting of dilute nitric acid and nitric acid with added sulfamate to extract the plutonium thereinto and be discharged at the opposite end of the extractor, countercurrently extracting impurities from the plutonium extract phase with a solution of fluorinated β-diketone in a solvent selected from the group consisting of hexone, benzene and alkyl benzenes and discharging the impurity extract with the residual organic extract phase containing the zirconium; continuously contacting the residual zirconium extract phase with a dilute nitric acid solution of oxalic acid to extract the zirconium therein in another extractor; neutralizing the zirconium extract to precipitate zirconium therefrom; recovering the plutonium from the aqueous plutonium extract after the zirconium is extracted; centerfeeding the aqueous effluent from the first multistage extractor through half of a first multistage uranium extractor, countercurrently extracting uranium from said effluent with a hexone extractant solution of thenoyltrifluoroacetone in at least the terminal stage of said extractor half, countercurrently extracting uranium from said effluent with hexone extractant introduced subsequent to said terminal stage to merge with said thenoyltrifluoroacetone solution and being discharged at the opposite end of said extractor, countercurrently scrubbing impurities from the extractant solutions with aqueous uranyl nitrate solution wherefrom the uranium is extracted by the merged extractant solutions and impurities are salted out into the scrub solution with the assistance of the extracted uranium ion content and the impure scrub solution is discharged with the aqueous effluent; and recovering uranium from the extractant solutions.

8. The process as defined in claim 7 wherein the uranium is recovered from the merged hexone extractant solutions discharged from said first multistage uranium extractor by countercurrent contact with dilute nitric acid in a second multistage uranium extractor yielding an acidic aqueous uranyl nitrate solution, concentrating said aqueous solution by evaporation, and recycling a portion of the concentrated solution as said purified uranyl nitrate scrub solution.

9. An integrated cyclic process for separating and recovering plutonium, zirconium and uranium from an impure mixture comprising producing a solution of at least the aforesaid materials in nitric acid having a concentration in the range of about 0.25 to 0.572 M, treating the solution with oxidation-reduction agents to place the plutonium in the IV oxidation state, then continuously countercurrently contacting the solution in a first multistage extractor with an extractant phase comprising a fluorinated β-diketone dissolved in a solvent, whereby the plutonium and zirconium are extracted therein leaving the uranium in the residual acid solution, continuously countercurrently contacting the extract phase with an aqueous nitric acid phase having a concentration in the range of about 1 to 2 M in a second multistage extractor to extract the plutonium therein and away from the solvent extract phase, then continuously countercurrently contacting the solvent extract phase in a third multistage extractor with a dilute nitric acid solution of oxalic acid to extract the zirconium therefrom, and continuously countercurrently contacting the residual acid solution from the first multistage reactor with hexone in a fourth multistage extractor to extract the uranium therefrom, and recovering the uranium from the hexone extract.

10. The process as defined in claim 9 wherein said fluorinated β-diketone comprises thenoyltrifluoroacetone.

11. In a process for recovering uranium from an impure solution in nitric acid of about 0.25 to 0.572 M concentration from which zirconium and plutonium have been removed, the steps comprising continuously centerfeeding said solution into a multistage extractor to pass through a plurality of stages in a first half section and be discharged from the last stage thereof, introducing a hexone solution of thenoyltrifluoroacetone into the discharge end of said first extractor section to countercurrently contact said solution in at least the terminal member of said plurality of stages, introducing hexone into said first column section to merge with said TTA solution after passage through said terminal extractor stages, said merged solution then countercurrently contacting the incoming solution in the remainder of said plurality of stages to thenceforth pass through the similar plurality of stages in the second half section of said extractor and being discharged terminally therefrom, whereby the merged hexone solution extracts the major portion and the hexone-TTA solution extracts the residual portion of the uranium away from the aqueous solution, and introducing a purified uranyl nitrate scrub solution terminally into the second half section of said extractor to countercurrently contact and transfer uranium into the merged hexone and hexone-thenoyltrifluoroacetone solution, whereby impurities are scrubbed from the hexone solutions assisted by the uranium content as increased by extraction with said scrub solution bearing the impurities finally being merged with the impure centerfed solution and passing therewith through the first extractor section.

References Cited in the file of this patent

UNITED STATES PATENTS

| | | |
|---|---|---|
| 2,111,360 | Cutting | Mar. 15, 1938 |
| 2,250,976 | Van Dijck | July 29, 1941 |
| 2,227,833 | Hixson et al. | Jan. 7, 1941 |
| 2,250,976 | Van dijck | July 29, 1941 |
| 2,683,655 | Peppard | July 13, 1954 |
| 2,690,376 | Hoffman | Sept. 28, 1954 |
| 2,743,157 | Hagemann et al. | Apr. 24, 1956 |
| 2,811,415 | Seaborg | Oct. 29, 1957 |

OTHER REFERENCES

Harvey et al.: "Journal of the Chemical Society," August 1947, pages 1010–1021.

McCarty et al.: U.S. Atomic Energy Commission unclassified document No. KAPL–180, dated Apr. 27, 1949, declassified Nov. 22, 1955 (45 pages).

Heisig et al.: U.S. AEC Unclas. Doc. No. UCRL–1169, dated July 30, 1952, declassified Dec. 8, 1955 (75 pages).

Flagg et al.: Scientific American, vol. 187, No. 1, pages 62–67 (July 1952).